US011410221B2

(12) United States Patent
Zundel et al.

(10) Patent No.: US 11,410,221 B2
(45) Date of Patent: Aug. 9, 2022

(54) INTEGRATED SECURE DELIVERY

(71) Applicant: Vivint, Inc., Provo, UT (US)

(72) Inventors: Michelle Zundel, Draper, UT (US); Michael D. Child, Lehi, UT (US)

(73) Assignee: VIVINT, INC., Provo, UT (US)

( * ) Notice: Subject to any disclaimer, the term of this patent is extended or adjusted under 35 U.S.C. 154(b) by 163 days.

(21) Appl. No.: 15/587,249

(22) Filed: May 4, 2017

(65) Prior Publication Data
US 2017/0236193 A1     Aug. 17, 2017

(51) Int. Cl.
*G06Q 30/06* (2012.01)
*G06Q 20/20* (2012.01)
*G06Q 10/08* (2012.01)

(52) U.S. Cl.
CPC ....... *G06Q 30/0635* (2013.01); *G06Q 10/083* (2013.01); *G06Q 10/0833* (2013.01); *G06Q 20/20* (2013.01)

(58) Field of Classification Search
CPC ............. G06Q 30/0635; G06Q 10/083; G06Q 10/0833; G06Q 20/20
See application file for complete search history.

(56) References Cited

U.S. PATENT DOCUMENTS

| | | | |
|---|---|---|---|
| 4,661,804 A | 4/1987 | Abel | |
| 5,865,368 A | 2/1999 | Taylor et al. | |
| 6,138,910 A | 10/2000 | Madruga | |
| 6,323,782 B1 | 11/2001 | Stephens et al. | |
| 6,476,858 B1 | 11/2002 | Ramirez et al. | |
| 6,570,488 B2 * | 5/2003 | Kucharczyk | A47G 29/141 340/5.2 |
| 6,696,918 B2 * | 2/2004 | Kucharczyk | A47G 29/141 340/5.21 |
| 6,725,127 B2 | 4/2004 | Stevens | |
| 6,862,576 B1 | 3/2005 | Turner et al. | |
| 6,879,836 B2 | 4/2005 | Nakamoto et al. | |
| 7,158,941 B1 | 1/2007 | Thompson et al. | |

(Continued)

FOREIGN PATENT DOCUMENTS

| | | |
|---|---|---|
| JP | 2011077835 A | 4/2011 |
| KR | 1020010016412 A | 3/2001 |

(Continued)

OTHER PUBLICATIONS

Walmsley, Andrew, "Not-so-special delivery," Marketing, 12, London, Haymarket Business Publications Ltd., Jan. 12, 2011.*

(Continued)

*Primary Examiner* — Nathan Erb
(74) *Attorney, Agent, or Firm* — Kunzler Bean & Adamson, PC

(57) ABSTRACT

A method for security and/or automation systems is described. In one embodiment, the method includes integrating, via a processor of a first computing device, a secure delivery option in relation to a checkout interface of a point of sale (POS) system. In some cases, the method includes receiving, via the processor, an input to enable the secure delivery option in relation to an order being placed via the checkout interface, generating, via the processor, an access code for the order based at least in part on enabling the secure delivery option, and enabling, via the processor, access to a premises via the access code generated for the order.

19 Claims, 8 Drawing Sheets

(56) References Cited

U.S. PATENT DOCUMENTS

| | | | |
|---|---|---|---|
| 7,518,485 B2 | 4/2009 | Shuster | |
| 7,653,603 B1 * | 1/2010 | Holtkamp, Jr. | A47G 29/141 |
| | | | 705/50 |
| RE43,178 E | 2/2012 | Ghazarian | |
| 8,261,976 B1 | 9/2012 | Block et al. | |
| 8,493,193 B2 | 7/2013 | Louis et al. | |
| 9,161,164 B2 | 10/2015 | Proctor et al. | |
| 9,418,495 B2 | 8/2016 | Mackin et al. | |
| 9,437,063 B2 * | 9/2016 | Schoenfelder | G07C 9/00309 |
| 9,449,317 B2 * | 9/2016 | Reblin | G06Q 10/08 |
| 9,536,359 B1 | 1/2017 | Gokcebay | |
| 9,626,857 B2 * | 4/2017 | Fokkelman | G06Q 10/083 |
| 9,721,147 B1 | 8/2017 | Kapczynski | |
| 2001/0045180 A1 | 11/2001 | McCormick et al. | |
| 2001/0050615 A1 * | 12/2001 | Kucharczyk | G07F 7/10 |
| | | | 340/568.1 |
| 2001/0051877 A1 * | 12/2001 | Steval | A47G 29/141 |
| | | | 705/26.1 |
| 2002/0027981 A1 | 3/2002 | Bedrosian et al. | |
| 2002/0035515 A1 | 3/2002 | Moreno | |
| 2002/0046173 A1 | 4/2002 | Kelly | |
| 2002/0067261 A1 * | 6/2002 | Kucharczyk | G07C 9/21 |
| | | | 340/568.1 |
| 2002/0087375 A1 | 7/2002 | Griffin et al. | |
| 2002/0087429 A1 | 7/2002 | Shuster et al. | |
| 2002/0112174 A1 * | 8/2002 | Yager | G06F 21/34 |
| | | | 726/2 |
| 2002/0113703 A1 | 8/2002 | Moskowitz et al. | |
| 2002/0138759 A1 | 9/2002 | Dutta et al. | |
| 2002/0147919 A1 | 10/2002 | Gentry et al. | |
| 2002/0156645 A1 | 10/2002 | Hansen et al. | |
| 2002/0178074 A1 | 11/2002 | Bloom et al. | |
| 2002/0180582 A1 * | 12/2002 | Nielsen | G07C 9/00103 |
| | | | 340/5.6 |
| 2003/0004889 A1 * | 1/2003 | Fiala | G06Q 20/342 |
| | | | 705/64 |
| 2003/0006275 A1 | 1/2003 | Gray et al. | |
| 2003/0022676 A1 | 1/2003 | Nakamoto et al. | |
| 2003/0023870 A1 | 1/2003 | Geros et al. | |
| 2003/0037009 A1 | 2/2003 | Tobin et al. | |
| 2003/0050732 A1 | 3/2003 | Rivalto | |
| 2003/0135432 A1 | 7/2003 | McIntyre et al. | |
| 2003/0195814 A1 | 10/2003 | Striemer et al. | |
| 2004/0149823 A1 | 8/2004 | Aptekar et al. | |
| 2004/0172403 A1 | 9/2004 | Steele et al. | |
| 2004/0185842 A1 | 9/2004 | Spaur et al. | |
| 2004/0243430 A1 | 12/2004 | Horstemeyer et al. | |
| 2004/0252017 A1 | 12/2004 | Holding et al. | |
| 2005/0061877 A1 | 3/2005 | Stevens | |
| 2005/0068178 A1 | 3/2005 | Lee et al. | |
| 2005/0088281 A1 | 4/2005 | Rohrberg et al. | |
| 2005/0131774 A1 * | 6/2005 | Huxter | G06Q 10/087 |
| | | | 705/26.1 |
| 2005/0187836 A1 | 8/2005 | Wolfe | |
| 2006/0108419 A1 * | 5/2006 | Som | G06Q 30/0603 |
| | | | 235/383 |
| 2006/0122852 A1 | 6/2006 | Moudy | |
| 2007/0005452 A1 | 1/2007 | Klingenberg et al. | |
| 2007/0024421 A1 | 2/2007 | Hale | |
| 2007/0052586 A1 | 3/2007 | Horstemeyer et al. | |
| 2007/0138270 A1 * | 6/2007 | Reblin | G06Q 10/08 |
| | | | 235/383 |
| 2007/0150375 A1 | 6/2007 | Yang et al. | |
| 2007/0193834 A1 | 8/2007 | Pai et al. | |
| 2007/0285227 A1 | 12/2007 | Timothy et al. | |
| 2008/0121682 A1 * | 5/2008 | Grim | A47G 29/141 |
| | | | 232/1 R |
| 2008/0252723 A1 | 10/2008 | Park | |
| 2009/0179735 A1 | 7/2009 | Van Rysselberghe et al. | |
| 2009/0298491 A1 | 12/2009 | Kadaba et al. | |
| 2010/0059587 A1 | 3/2010 | Miller et al. | |
| 2010/0241564 A1 | 9/2010 | Miller et al. | |
| 2010/0303307 A1 | 12/2010 | Rothschild | |
| 2011/0130134 A1 * | 6/2011 | Van Rysselberghe | G07C 9/00571 |
| | | | 455/422.1 |
| 2011/0238574 A1 | 9/2011 | Miller et al. | |
| 2011/0276510 A1 | 11/2011 | Turbeville et al. | |
| 2011/0316683 A1 | 12/2011 | Louis et al. | |
| 2012/0030124 A1 | 2/2012 | Cronkright et al. | |
| 2012/0030133 A1 | 2/2012 | Rademaker et al. | |
| 2012/0044050 A1 | 2/2012 | Vig et al. | |
| 2012/0169453 A1 * | 7/2012 | Bryla | E05B 47/00 |
| | | | 340/3.1 |
| 2012/0223133 A1 | 9/2012 | Miller et al. | |
| 2012/0226622 A1 | 9/2012 | Gonzalez et al. | |
| 2012/0233085 A1 | 9/2012 | Zimberoff et al. | |
| 2012/0249328 A1 | 10/2012 | Xiong | |
| 2013/0010144 A1 | 1/2013 | Park | |
| 2013/0017812 A1 | 1/2013 | Foster | |
| 2013/0027552 A1 | 1/2013 | Guzik | |
| 2013/0261792 A1 | 10/2013 | Gupta et al. | |
| 2013/0311365 A1 | 11/2013 | Miller et al. | |
| 2014/0046842 A1 | 2/2014 | Irudayam et al. | |
| 2014/0052660 A1 | 2/2014 | Lee et al. | |
| 2014/0118144 A1 | 5/2014 | Amis | |
| 2014/0156472 A1 | 6/2014 | Stuntebeck et al. | |
| 2014/0195626 A1 | 7/2014 | Ruff et al. | |
| 2014/0221012 A1 | 8/2014 | Uetabira | |
| 2014/0252091 A1 | 9/2014 | Morse et al. | |
| 2014/0257691 A1 | 9/2014 | Siris | |
| 2014/0266669 A1 | 9/2014 | Fadell et al. | |
| 2014/0279596 A1 | 9/2014 | Waris et al. | |
| 2014/0279666 A1 | 9/2014 | Lievens | |
| 2014/0317005 A1 | 10/2014 | Balwani et al. | |
| 2014/0324192 A1 | 10/2014 | Baskaran et al. | |
| 2014/0334684 A1 | 11/2014 | Strimling | |
| 2014/0351125 A1 | 11/2014 | Miller et al. | |
| 2015/0058056 A1 | 2/2015 | Comerford et al. | |
| 2015/0102903 A1 | 4/2015 | Wilkinson | |
| 2015/0123766 A1 | 5/2015 | St. John | |
| 2015/0142594 A1 * | 5/2015 | Lutnick | G06Q 30/04 |
| | | | 705/21 |
| 2015/0143461 A1 | 5/2015 | Uetabira | |
| 2015/0186869 A1 * | 7/2015 | Winters | G06Q 20/3255 |
| | | | 705/26.81 |
| 2015/0187136 A1 | 7/2015 | Grimaud | |
| 2015/0194000 A1 * | 7/2015 | Schoenfelder | G07C 9/00309 |
| | | | 340/5.61 |
| 2015/0199673 A1 * | 7/2015 | Savolainen | G06Q 20/3226 |
| | | | 705/71 |
| 2015/0199857 A1 * | 7/2015 | Mackin | G07C 9/00023 |
| | | | 340/5.26 |
| 2015/0221151 A1 | 8/2015 | Bacco et al. | |
| 2015/0261956 A1 | 9/2015 | Anderson et al. | |
| 2015/0302495 A1 | 10/2015 | Stuckman et al. | |
| 2015/0310443 A1 | 10/2015 | Thomasson | |
| 2016/0027093 A1 * | 1/2016 | Crebier | G07F 17/12 |
| | | | 705/26.81 |
| 2016/0088287 A1 | 3/2016 | Sadi et al. | |
| 2016/0105644 A1 * | 4/2016 | Smith | H04N 5/23206 |
| | | | 348/159 |
| 2016/0142644 A1 | 5/2016 | Lin et al. | |
| 2016/0171435 A1 | 6/2016 | Newton et al. | |
| 2016/0185503 A1 | 6/2016 | Balwani | |
| 2016/0259928 A1 | 9/2016 | Donenfeld | |
| 2016/0301674 A1 | 10/2016 | Uetabira | |
| 2016/0371620 A1 | 12/2016 | Nascenzi et al. | |
| 2017/0109950 A1 | 4/2017 | Bacco et al. | |
| 2017/0149758 A1 | 5/2017 | Uetabira | |
| 2017/0213033 A1 | 7/2017 | Anderson et al. | |
| 2017/0236101 A1 | 8/2017 | Irudayam et al. | |
| 2017/0372321 A1 | 12/2017 | Weiss | |
| 2018/0151013 A1 | 5/2018 | Carstens et al. | |
| 2018/0232976 A1 * | 8/2018 | Schoenfelder | G07C 9/00111 |
| 2018/0322289 A1 | 11/2018 | Anderson et al. | |
| 2019/0114853 A1 * | 4/2019 | Schoenfelder | G07C 9/00111 |

(56) References Cited

U.S. PATENT DOCUMENTS

FOREIGN PATENT DOCUMENTS

| KR | 1020060111749 A | 10/2006 |
|---|---|---|
| KR | 1020130082790 A | 7/2013 |
| WO | 2007098217 A2 | 8/2007 |

OTHER PUBLICATIONS

International Search Report and Written Opinion of the International Searching Authority for PCT/US2015/026930, dated Jul. 28, 2015.
English machine translation of JP 2011-077835, Apr. 14, 2011.
English machine translation of KR 10-2001-0046412, Mar. 5, 2001.
English machine translation of KR 10-2006-0111749, Oct. 30, 2006,.
English machine translation of KR 10-2013-0082790, Sep. 22, 2013,.
Guo, H. et al., "Joint Video Stitching and Stabilization from Moving Cameras", IEEE Transactions on Image Processing, vol. 25, No. 11, Nov. 2016, pp. 5491-5503.
Jiang, W. et al., "Video Stitching with Spatial-Temporal Content-Preserving Warping", Computer Vision and Pattern Recognition Workshops (CVPRW), 2015 IEEE Conference on Date of Conference: Jun. 7-12, 2015 Date Added to IEEE Xplore: Oct. 26, 2015, Electronic ISSN: 2160-7516 INSPEC Accession No. 15554203 DOI: 10.1109/CVPRW.2015.7301374.
Rieffel, E. G. et al., "Geometric Tools for Multicamera Surveillance Systems", Distributed Smart Cameras, 2007, ICDSC '07, First ACM/IEEE International Conference on Date of Conference: Sep. 25-28, 2007, FX Palo Alto Laboratory, Palo Alto, CA, Oct. 22, 2007, 8 pp.
Extended European Search Report for EP Application No. 15786776.3, dated Aug. 9, 2017 (7 pp.).
PCT International Search Report for International Application No. PCT/US2018/030240, dated Aug. 14, 2018 (3 pp.).
Vast-Binder Jr., John Philip, Mailman: Studies of Urban Letter Carriers, Northwestern University, Evanston, Illinois, Aug. 1973.
Shemkus, Sarah, "Pressure to deliver: For FedEx, UPS holiday challenge includes throwing off the thieves," Boston Globe, Boston u Globe Media Partners LLC, Boston, Massachusetts, B.5, Dec. 19, 2012.

\* cited by examiner

INTEGRATED SECURE DELIVERY

BACKGROUND

The present disclosure, for example, relates to security and/or automation systems, and more particularly to secure package delivery.

Security and automation systems are widely deployed to provide various types of communication and functional features such as monitoring, communication, notification, and/or others. These systems may be capable of supporting communication with a user through a communication connection or a system management action. However, security and automation systems may not be configured to provide secure package delivery since packages may be delivered outside of a premises.

SUMMARY

The disclosure herein includes methods and systems for improving secure delivery of packages. In some embodiments, the present systems and methods may enable a delivery service to safely and securely deliver packages to a premises.

A method for security and/or automation systems is described. In one embodiment, the method may include integrating, via a processor of a first computing device, a secure delivery option in relation to a checkout interface of a point of sale (POS) system. In some cases, the method may include receiving, via the processor, an input to enable the secure delivery option in relation to an order being placed via the checkout interface, generating, via the processor, an access code for the order based at least in part on enabling the secure delivery option, and enabling, via the processor, access to a premises via the access code generated for the order.

In some embodiments, the method may include sending the generated access code to a second computing device associated with a delivery service assigned to deliver an item from the order. In some embodiments, the method may include receiving a request from the second computing device associated with the delivery service and verifying the request before sending the generated access code to the second computing device. In some cases, the secure delivery option includes at least one option to configure a custom access code in relation to placing the order via the checkout interface, to select a preconfigured access code that is preconfigured by the first computing device, to select a random access code randomly selected by the first computing device, to select a delayed access code that is generated upon receiving the request from the delivery service, to select a delivery time, to select a delivery area in relation to the premises, to select a location within the delivery area, to provide textual delivery instructions, to provide audible delivery instructions, or any combination thereof.

In some embodiments, the method may include encrypting the generated access code and storing the encrypted access code in a secure storage location. In some embodiments, the method may include verifying the access code provided by a delivery person before enabling access to the premises. In some embodiments, the method may include verifying information associated with the delivery person before verifying the access code.

In some cases, the first computing device may include a computer of the POS system, a mobile computing device of an occupant of the premises, a control panel of an automation system at the premises, or any combination thereof. In some cases, the POS system may include at least one of a third-party POS system, an online POS system, a retail POS system at a physical location, or any combination thereof. In some cases, the access code may include a one-time access code.

An apparatus for security and/or automation systems is also described. In one embodiment, the apparatus may include a processor, memory in electronic communication with the processor, and instructions stored in the memory, the instructions being executable by the processor to perform the steps of integrating a secure delivery option in relation to a checkout interface of a point of sale (POS) system, receiving an input to enable the secure delivery option in relation to an order being placed via the checkout interface, generating an access code for the order based at least in part on enabling the secure delivery option, and enabling access to a premises via the access code generated for the order.

A non-transitory computer-readable medium is also described. The non-transitory computer readable medium may store computer-executable code, the code being executable by a processor to perform the steps of integrating a secure delivery option in relation to a checkout interface of a point of sale (POS) system, receiving an input to enable the secure delivery option in relation to an order being placed via the checkout interface, generating an access code for the order based at least in part on enabling the secure delivery option, and enabling access to a premises via the access code generated for the order.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
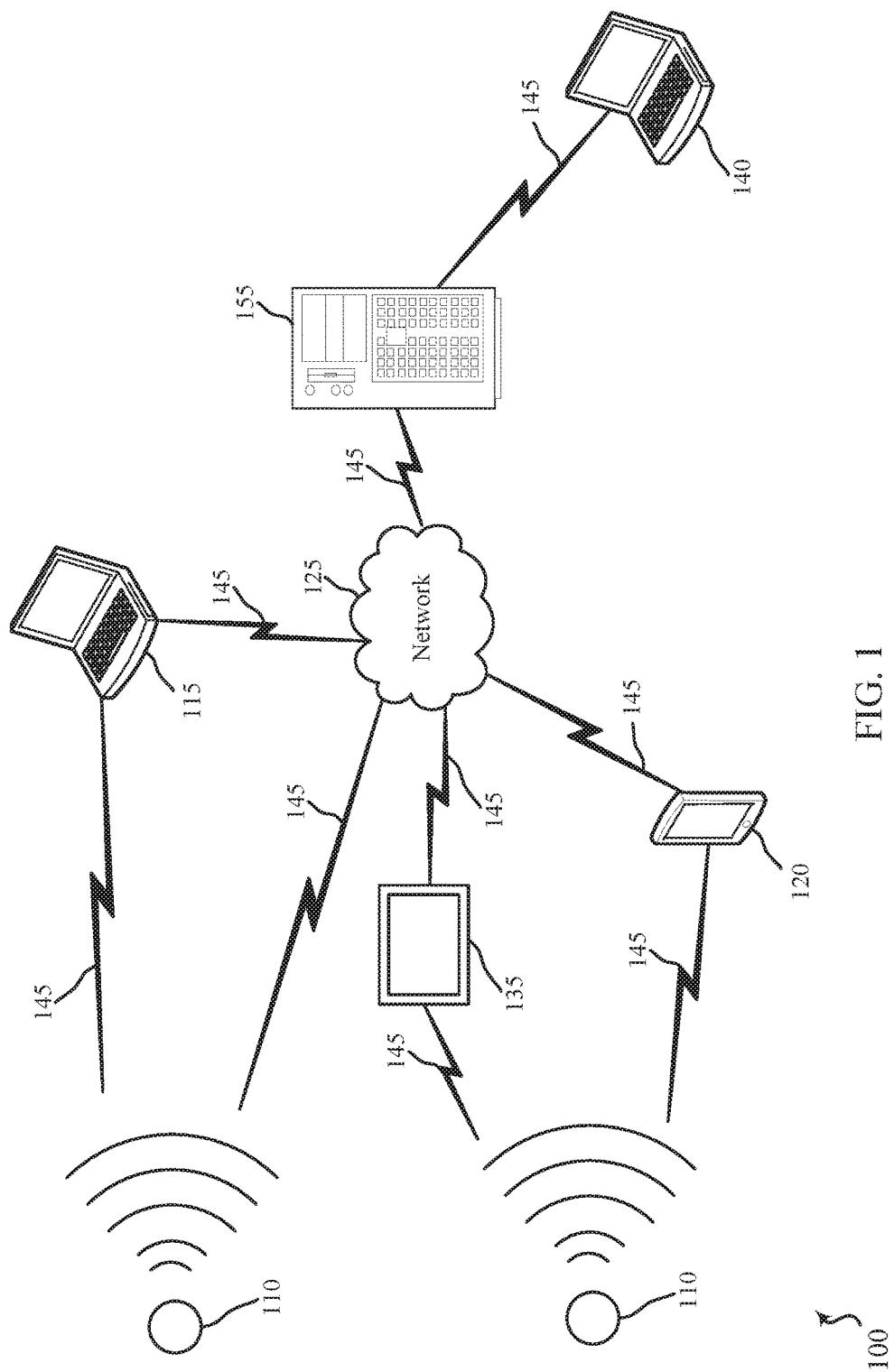
FIG. 1 is a block diagram of an example of a security and/or automation system in accordance with various embodiments.

The following relates generally to automation and/or security systems. Automation systems may include one or more sensors located a premises. For example, sensors located at the entrance may include a keypad sensor, an automated door lock, a microphone, a speaker, a camera sensor, a motion sensor, a proximity sensor, and/or an audio sensor, among others.

The systems and methods described herein relate to systems and methods of secure delivery. More specifically, the systems and methods described herein relate to secure delivery of a parcel to a premises such as a home or business. Currently, several drawbacks exist with the conventional delivery model. For example, the typical delivery to a home or residence includes the delivery person approaching a door, knocking on the door and/or ringing a doorbell, waiting for an occupant to answer the door, and leaving the parcel near the doorstep if no one answers the door. In most cases, the delivery person simply knocks on the door and leaves the parcel on the door step without waiting for someone to answer the door. This delivery model leaves the parcel vulnerable to theft as the parcel may be easily visible from the street. Theft of delivered parcels from door steps is a significant problem, especially during the holiday season when the number of parcel deliveries increases significantly.

The present systems and methods relate to improving the security of parcel deliveries. In one embodiment of the present systems and methods, seamless configuration for secure delivery of a parcel may be integrated with a point of sale (POS) system. The POS system may include online checkout systems, a register or terminal at a physical retail location, or any combination thereof. For example, the systems and methods may include an occupant of a premises purchasing an item from an online retailer and implementing a secure delivery of the item to the premises from a checkout interface of the online retailer. Similarly, the systems and methods may include an occupant purchasing an item at a physical retail location and arranging a secure delivery of the item in relation to the purchase.

In some embodiments, under a conventional delivery model some parcels may include a requirement for a signature in order for the delivery person to release custody of a parcel. In these cases, the delivery person may wait for someone to answer the door after knocking. However, if no one answers the door, the delivery person may leave a note indicating that an attempt was made to deliver the parcel and that the delivery person will return on a specified day to attempt again to deliver the parcel. If no one answers the door on the second delivery attempt, the delivery person may leave a note indicating that the recipient can pick up the parcel at a designated delivery location. The conventional system results in additional costs and inconvenience to both delivery companies as well as the recipients of the parcels.

The present systems and methods remedy the problems with conventional delivery services. In one embodiment, the occupant may configure one or more aspects of the secure delivery at the time of purchase from either an online retailer or a physical retailer. In some cases, the occupant may select which location to deliver the item such as a front door, back door, a garage door, a gate, a lockbox at the premises, etc. In one embodiment, the occupant may select a delivery time for the secure delivery. For example, the occupant may select a day the parcel is to be delivered, a time of day the parcel is to be delivered, a window of time during which the parcel is to be delivered such as between 9:00 AM and 11:00 AM on a particular day, or any combination thereof. In some cases, a secure delivery interface may include delivery time options from which the occupant may select to configure the delivery time.

In one embodiment, the secure delivery interface may include software code integrated with the software code of a third-party retailer that is implemented in a POS system of the third-party retailer. For example, a third-party retailer may add software code of the secure delivery interface to the software code of the third-party retailer's POS system. Additionally, or alternatively, software code of the delivery interface may be implemented in a browser and/or on an application of a computing device such as a desktop application or mobile application. In some cases, software code of the delivery interface may be implemented in conjunction with a secure delivery browser plug-in.

In some cases, the occupant may configure an access code for the secure delivery. In one embodiment, the access code may be generated in real-time upon request. In some embodiments, the access code may be randomly generated. In some embodiments, generation or selection of the access code may be delayed to after the time of sale. For example, the occupant may choose a delayed generation of an access code when implementing secure delivery when purchasing an item.

In one embodiment, a POS system may be configured to communicate with an automation system of an occupant making a purchase via the POS system. In one embodiment, the POS system may communicate information regarding a secure delivery to the automation system. For example, the POS system may communicate a scheduled delivery time for the parcel. In some embodiments, the automation system may generate an access code based on the scheduled delivery time. For example, if purchase of an item were made on January 1 and delivery of the item were scheduled for January 4 after 1:00 PM and before 3:00 PM, then automation system may receive the scheduled delivery time and generate the access code based at least in part on the scheduled delivery time. For example, the automation system may generate the access code on January 4 at 12:00 PM, or one hour before the time window during which the item is scheduled to be delivered, and provide the access code to a machine of the delivery service or delivery person. In some cases, the POS system may generate the access code at the time of sale or at a delayed time and provide the generated access code to a machine of the delivery service or delivery person.

In some embodiments, information in addition to the access code may be provided to the delivery service and/or delivery person. In one embodiment, the secure delivery interface may request an occupant of the premises to select a delivery area (e.g., front of the house, back of the house, garage, etc.) and to specify a location within the delivery area where the parcel is to be placed by the delivery person (e.g., just inside the front door, on the left side of the garage against the wall, etc.). In some cases, the information provided may include information regarding a designated area or location of the premises where the parcel is to be delivered, a text-based description of the area (e.g., delivery inside the front door, deliver inside the garage, deliver inside the gate, etc.), instruction how to use the access code, instructions of how to open and close a door such as a garage door or door of a security box, instructions to ensure the garage door fully closes before leaving, an image of the designated delivery location, or any combination thereof.

In some embodiments, the access code may be generated by the POS system and/or the automation system based on monitored tracking information. As one example, an automation system may monitor tracking information provided by the delivery service and/or the retailer, detect an update to tracking information, identify information from tracking information that indicates the item is out for delivery, generate the access code based on the tracking information, and send the generated access code to the delivery service. In one embodiment, the automation system may receive contact information from the POS system and/or the delivery service for a delivery person designated to deliver the parcel. For example, the automation system may receive an email and/or text messaging number associated with the delivery person. Accordingly, the automation system may send an email and/or text message directly to the delivery person.

In some embodiments, the configured access code may include a one-time access code. In one embodiment, the online retailer or physical retailer may provide the one-time access code to a delivery person assigned to deliver the associated parcel. In one embodiment, an automation system at the premises may provide the one-time access code to a delivery person assigned to deliver the associated parcel. In some embodiments, the occupant of the premises may provide the access code to the delivery person.

Accordingly, the present systems and methods resolve these and other issues by enabling the secure delivery of parcels to a designated delivery area of a premises where the parcel is scheduled to be delivered. Even when no one is home or present at a business, a delivery person may be enabled to deliver a parcel to a designated area of a premises without granting the delivery person full access to the premises. For example, an automated system may grant the delivery person access to a garage area of a premises while ensuring all other access points to the premises area are locked and secure such as by ensuring the door from the garage to inside the premises is locked, etc. In another example, an automated system may grant the delivery person access to a lobby of a business or entry of a home while ensuring other access points to the business or home are locked and secure.

In some embodiments, the system may monitor the delivery area while the delivery person is delivering the parcel, capturing one or more images of the delivery area which may be captured and sent to one or more occupants of the premises in real-time to enable the occupant to monitor the delivery in-progress. In some embodiments, the automation system may generate an alert if the automation system determines a delivery person remains inside the premises beyond a predetermined entry time period. For example, the automation system may be configured to monitor how long the delivery person maintains access to the area that is unlocked by the provided access code and if the time period exceeds a predetermined time period such as 30 seconds, then the automation system may send an alert to an occupant indicating the breach of time.

In some cases, the automation system may monitor what areas of the premises the delivery person accesses in relation to delivering the parcel. In some cases, the automation system may be configured to identify permitted locations or areas of the premises and prohibited locations or areas of the premises. In one embodiment, automation system may track a location of the delivery person via one or more sensors such as security cameras, motion detectors, etc. Upon determining the delivery person enters a prohibited area, the automation system may send an alert to the occupant regarding the location breach and/or play an audible alert indicating to the delivery person the detected location breach. For example, a pre-recorded message may state that a location breach has been detected, that the location breach has been recorded, that an occupant has been notified of the location breach, or any combination thereof. In some cases, a verbal pre-recorded message may be provided to the delivery person upon arriving at the premises. For example, a pre-recorded message may be provided by a speaker of an intercom at a front door or via a speaker of a doorbell camera, etc. In some cases, the prerecorded message may provide instructions to the delivery person regarding where to deliver the parcel, where the delivery person may go in the premises, where the delivery person is not allowed to go, that the delivery is being monitored in real-time, or any combination thereof.

In one embodiment, the automation system may verify an identity and/or information associated with the delivery person. In some embodiments, the automation system may verify an authenticity of the delivery person. For example, the automation system may verify an identity code to authenticate the delivery person as an actual delivery person of the delivery service. In some cases, upon verifying information associated with and/or provided by the delivery person (e.g., identity, temporary access code, etc.), the delivery person may be granted access to the delivery area. Additionally, or alternatively, upon verifying that at least one monitored locking mechanism of the premises is in a locked position, the delivery person may be granted access to the delivery area. At least one photographic and/or video image may be captured of the delivery person in the delivery area placing the parcel at the designated delivery location.

In some embodiments, the automation system may send a temporary access code to a device associated with the delivery person. For example, upon detecting the arrival and/or verifying the identity of the delivery person, the automation system may send a temporary access code to a device of the delivery person (e.g., smart phone, tablet computing device, BLUETOOTH® device, etc.). The temporary access code may include a temporary electronic key configured to unlock a door at the premises, a temporary frequency code configured to open the garage door wirelessly, or a temporary keypad code configured to open the garage door via a keypad outside the garage door, etc. The temporary access code may be configured to operate only during a predetermined time period (e.g., based on an expected time of delivery received by the automation system, etc.), upon detecting the arrival of the delivery person, and/or upon authenticating the identity of the delivery person.

FIG. 1 is an example of a communications system 100 in accordance with various aspects of the disclosure. In some embodiments, the communications system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, and/or remote computing device 140, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an IPOD®, an IPAD®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, at least one processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some embodiments, the one or more sensor units 110 may be sensors configured to conduct periodic or ongoing automatic measurements related to voice, button press, audio and/or image data signals. Each sensor unit 110 may be capable of sensing multiple voice, button press, audio and/or image parameters, or alternatively, separate sensor units 110 may monitor separate audio and image parameters. For example, one sensor unit 110 may monitor audio (e.g., delivery person voice, etc.), another sensor unit 110 (or, in some embodiments, the same sensor unit 110) may detect a button press (e.g., delivery person entering an access code, etc.), while another sensor unit 110 (or, in some embodiments, the same sensor unit 110) may detect images (e.g., photo, video, motion detection, infrared, etc.).

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer and/or smart phone. Where local computing device 115, 120 is a smart phone, the smart phone may have a dedicated application directed to collecting audio and/or video data and calculating object detection therefrom. The local computing device 115, 120 may process the data received from the one or more sensor units 110 to obtain a probability of an object within an area of a premises such as an object within a predetermined distance of an entrance to the premises as one example. In alternate embodiments, remote computing device 140 may process the data received from the one or more sensor units 110, via network 125 and server 155, to obtain a probability of detecting an object within the vicinity of an area of a premises, such as detecting a person at an entrance to the premises for example. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of passive audio data from a sensor unit 110, a stream of active audio data from the same or a different sensor unit 110, a stream of button press inputs (e.g., a delivery person entering an access code, etc.), a stream of image (e.g., photo and/or video) data from either the same or yet another sensor unit 110, and a stream of motion data from either the same or yet another sensor unit 110.

In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory and/or through a wired and/or a wireless connection) containing audio and/or video data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
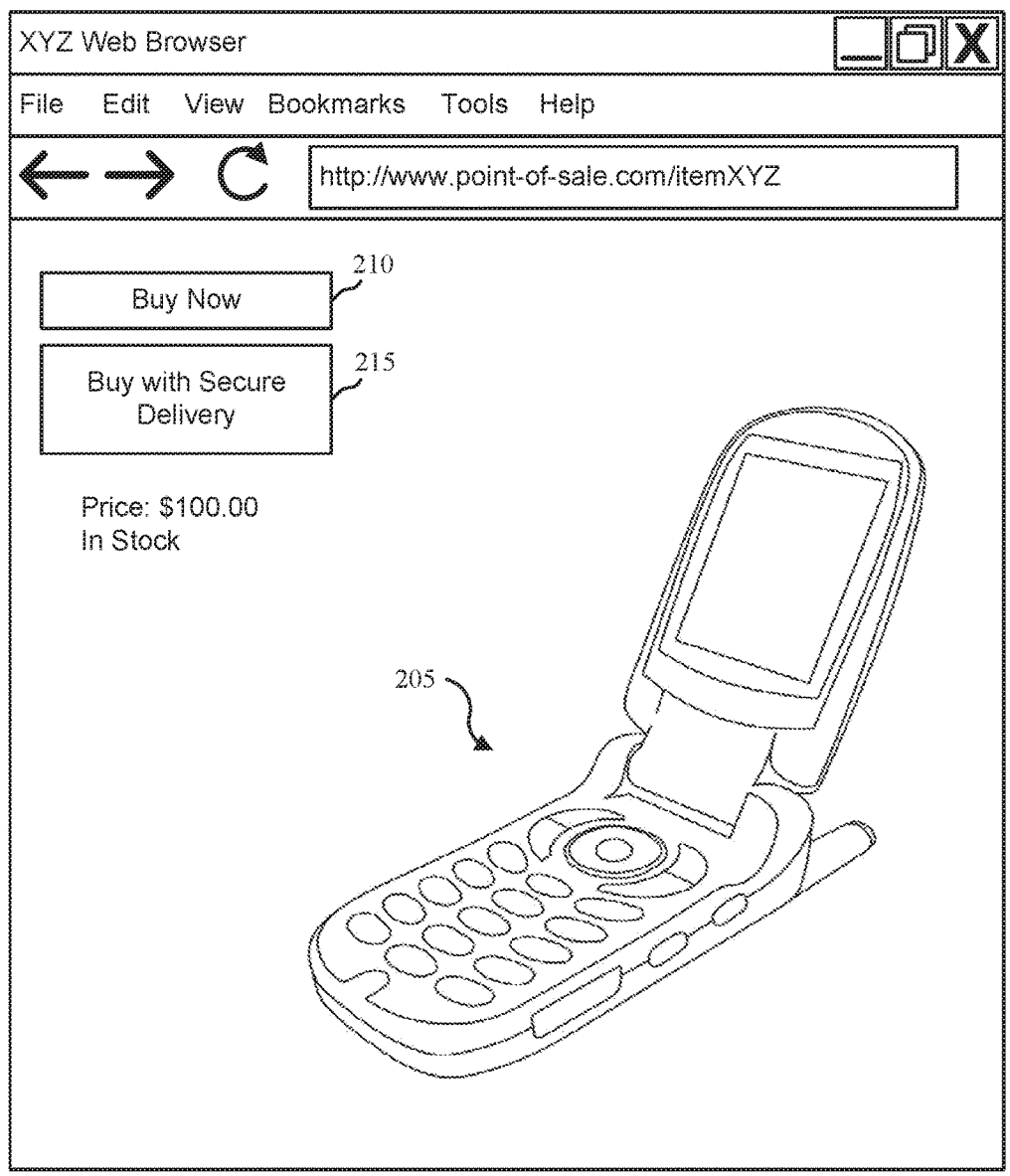
FIG. 2 shows an environment relating to a security and/or an automation system, in accordance with various aspects of this disclosure.

FIG. 2 illustrates an example arrangement of a web page displayed in a web browser 200. The depicted web browser 200 may include one or more web resources. In the illustrated example, web browser 200 may include a title bar, a menu bar, an address bar in which a user may enter an internet protocol (IP) address or enter a website uniform resource locator (URL). The web page may include text fields, web forms, external links, software code, and other text-based information typically associated with a web page.

In the illustrated example, a user may navigate a web browser to a webpage of an item for sale 210 by an online retailer. As shown, the webpage of the item for sale 210 may include a buy now button 210. In some cases, the webpage of the item for sale 210 may include a buy with secure delivery button 215. In some embodiments, a user may initiate a secure delivery of an item by pressing the secure delivery button 215.

Figure 3:
FIG. 3 shows an environment relating to a security and/or an automation system, in accordance with various aspects of this disclosure.

FIG. 3 illustrates an example arrangement of a web page displayed in a web browser 300. The depicted web browser 300 may be one example of the web browser 200 from FIG. 2. In the illustrated example, the web browser 300 displays a shopping cart of an online retailer. As shown, an item for sale 305 is added to the shopping cart of the online retailer. In some embodiments, a shopping cart may include one or more options for secure delivery of the item for sale 305.

As shown, the web browser 300 includes secure delivery access code options 310. In one embodiment, the secure delivery access code options 310 may include an option to generate a custom access code selected by the purchaser. Additionally or alternatively, the secure delivery access code options 310 may include at least one option to generate a random access code, generate a preconfigured access code, and generate a delayed access code, or any combination thereof. In some embodiments, generation or selection of the access code may be delayed to after the time of sale. For example, the purchaser may choose a delayed generation of an access code when implementing secure delivery in relation to purchasing an item. In some cases, the delayed access code may be a custom access code, a random access code, or preconfigured access code.

In some embodiments, web browser 300 may include secure delivery options 315. In one embodiment, the secure delivery options 315 may include an option to select a delivery area at the premises where the package is to be delivered. For example, a purchaser may choose a garage as the designated location at the premises. Accordingly, the provided access code may enable the delivery person to access the garage of the premises. In some cases, the purchaser may choose just inside a front door at the premises. Accordingly, the provided access code may enable the delivery person to access inside the front door of the premises. Additionally or alternatively, the secure delivery options 315 may include an option to select a delivery time. For example, a purchase may choose a window of time such as a two hour window between 12:00 PM and 2:00 PM on Friday, Apr. 14, 2017. In some cases, the secure delivery options 315 may include an option to provide delivery instructions. For example, a purchaser may enter textual instructions such as "Please close the garage door when finished delivering the item inside the garage." In some cases, the textual instructions may be delivered via a message such as an email message, text message, social media message, etc. In some cases, an automation system may use a text-to-speech algorithm to convert the text to speech and speak the text at a speaker of the premises. In some cases, the secure delivery options 315 may include an option for the purchaser to record audio instructions using a microphone. For example, the secure delivery options 315 may include a "record audio" button that enables the purchaser to record audio delivery instructions.

Figure 4:
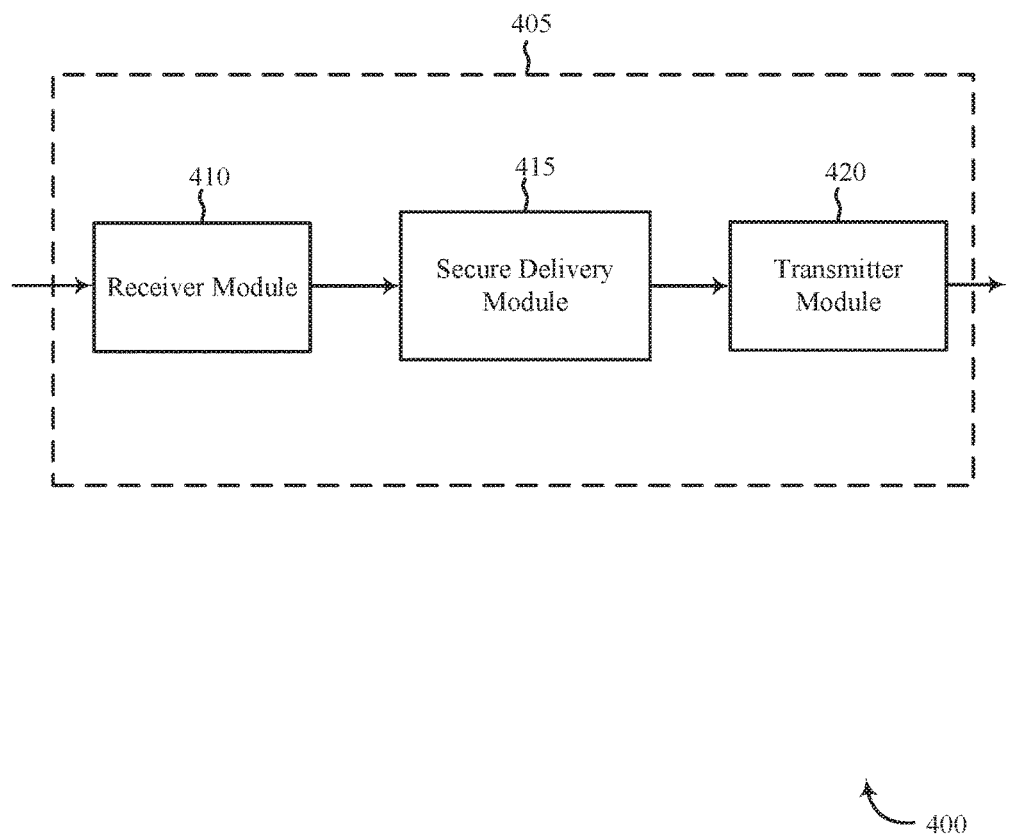
FIG. 4 shows a block diagram of a device relating to a security and/or an automation system, in accordance with various aspects of this disclosure.

FIG. 4 shows a block diagram 400 of an apparatus 405 for use in electronic communication, in accordance with various aspects of this disclosure. The apparatus 405 may be an example of one or more aspects of a control panel 135 described with reference to FIG. 1. The apparatus 405 may include a receiver module 410, a secure delivery module 415, and/or a transmitter module 420. The apparatus 405 may also be or include a processor. Each of these modules may be in communication with each other and/or other modules-directly and/or indirectly.

The components of the apparatus 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 410 may receive information such as packets, user data, and/or control information associated with various information channels (e.g., control channels, data channels, etc.). The receiver module 410 may be configured to receive voice signals (e.g., voice of a delivery person, etc.) and/or data, button press signals and/or data (e.g., delivery person entering an access code on a keypad), audio signals and/or data (e.g., voice of a delivery person) and/or image signals and/or data (e.g., capture an image of a delivery person, etc.). Information may be passed on to the secure delivery module 415, and to other components of the apparatus 405.

The secure delivery module 415 may be configured to generate an access code in relation to a purchase of an item designated to be delivered to a premises. In some cases, the secure delivery module 415 may provide the generated access code to a delivery service to enable the delivery service to securely deliver the item to the premises such as inside a secured area of the premises.

The transmitter module 420 may transmit the one or more signals received from other components of the apparatus 405. The transmitter module 420 may transmit button press signals and/or data (e.g., delivery person pressing a button, etc.), audio signals and/or data (e.g., audio recordings of a delivery person, etc.) and/or image signals and/or data (e.g., images of the delivery person, etc.). In some cases, transmitter module 420 may transmit results of data analysis on the button press, audio, and/or image signals and/or data analyzed by secure delivery module 415. In some examples, the transmitter module 420 may be collocated with the receiver module 410 in a transceiver module. In other examples, these elements may not be collocated.

Figure 5:
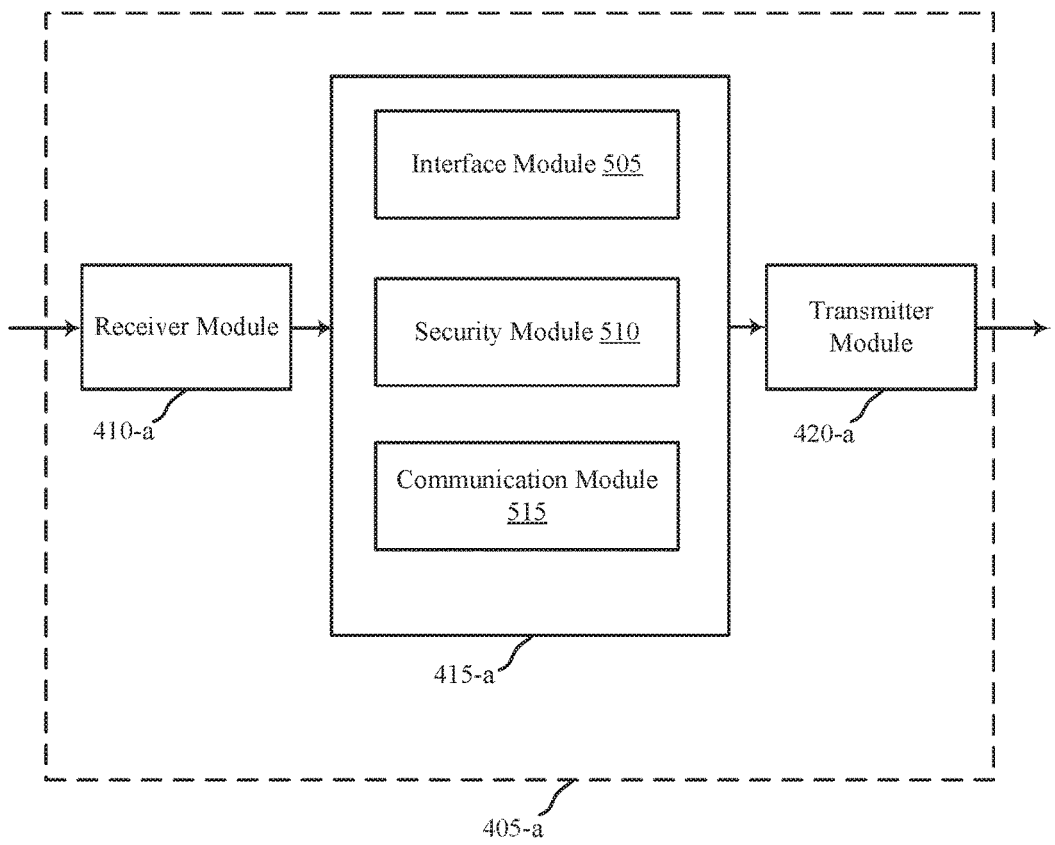
FIG. 5 shows a block diagram of a device relating to a security and/or an automation system, in accordance with various aspects of this disclosure.

FIG. 5 shows a block diagram 500 of an apparatus 405-a for use in wireless communication, in accordance with various examples. The apparatus 405-a may be an example of one or more aspects of a control panel 135 described with reference to FIG. 1. It may also be an example of an apparatus 405 described with reference to FIG. 4. The apparatus 405-a may include a receiver module 410-a, a secure delivery module 415-a, and/or a transmitter module 420-a, which may be examples of the corresponding modules of apparatus 405. The apparatus 405-a may also include a processor. Each of these components may be in communication with each other. The secure delivery module 415-a may include interface module 505, security module 510, and communication module 515. The receiver module 410-a and the transmitter module 420-a may perform the functions of the receiver module 410 and the transmitter module 420, of FIG. 4, respectively.

In one embodiment, interface module 505 may be configured to integrate a secure delivery option in relation to a checkout interface of a point of sale (POS) system. In some cases, the POS system may include at least one of a third-party POS system, an online POS system, a retail POS system at a physical location, or any combination thereof. In some examples, the POS system may include any sort of retail system, payment system, checkout system, or any combination thereof. In some cases, the POS system may include a retail POS system at a physical retail location. Additionally or alternatively, the POS system may include an online POS system, a web-based POS system, an online payment system, an online checkout system, or any combination thereof. Additionally or alternatively, interface module 505 may integrate a secure delivery option in a web browser. For example, interface module 505 may include a browser plug in that integrates the secure delivery option in an associated web browser.

In some embodiments, interface module 505 may integrate the secure delivery option on a mobile device payment system. For example, interface module 505 may integrate a secure delivery option in a payment system installed on a mobile device such as a smartphone. When a user selects to pay for an item on his/her mobile device, interface module 505 may provide an option for the user to select a secure delivery and/or to configure the secure delivery.

In some embodiments, interface module 505 may be configured to receive an input to enable the secure delivery option. In some cases, interface module 505 may receive the input as part of an order being placed on a POS system. As one example, interface module 505 may receive the input relative to a checkout interface of the POS system.

In some embodiments, interface module 505 may be configured to generate an access code in relation to an order placed on a POS system. In some cases, the access code may include a one-time access code. In some examples, interface module 505 may be configured to generate an access code for an order based at least in part on an enabling of a secure delivery option. In some cases, a user may enable a secure delivery option for each order. Additionally or alternatively, a secure delivery option may be automatically enabled for each order. For example, interface module 505 may provide a user an option to apply secure delivery to each order associated with at least one POS system. For example, interface module 505 may enable a user to select automatic secure delivery for orders placed at retailer A, manual secure delivery selection for orders placed at retailer B, and automatic secure delivery for orders placed at retailer C, etc.

In some cases, the secure delivery option may include at least one option to configure a custom access code in relation to placing the order via the checkout interface, to select a preconfigured access code that is preconfigured by the first computing device, to select a random access code randomly selected by the first computing device, to select a delayed access code that is generated upon receiving the request from the delivery service, to select a delivery time, to select a delivery area in relation to the premises, to select a location within the delivery area, to provide textual delivery instructions, to provide audible delivery instructions, or any combination thereof. For example, interface module 505 may enable a user to select automatic secure delivery with a random access code and delivery to location X for orders placed at retailer A, manual secure delivery selection with delivery to location Y for orders placed at retailer B, and automatic secure delivery with a custom access code and delivery to location Z for orders placed at retailer C, etc. In one embodiment, interface module 505 may provide a centralized interface that enables a user to configure secure delivery settings for multiple POS systems and/or retailers. For example, interface module 505 may display a list of associated retailers with options to configure secure delivery options individually for each retailer listed. Additionally or alternatively, interface module 505 may provide a different or unique interface for each specific POS system and/or retailer. For example, interface module 505 may display a first set of secure delivery options for a first online retailer when a user is purchasing an item from the first online retailer and display a second set of secure delivery options for a second online retailer when a user is purchasing an item from the second online retailer, where the second set of secure delivery options are different from the first set of secure delivery options.

In some cases, interface module 505 may integrate secure delivery options in conjunction with a cooperating retailer. For example, retailer A may enable and/or install secure delivery functionality on a server that serves a retailing website of retailer A. For example, retailer A may add software code to the server to enable secure delivery functionality, install a software application on the server to enable secure delivery functionality, install hardware on the server to enable secure delivery functionality, or any combination thereof.

In some cases, interface module 505 may be configured to generate an access code and associate the generated access code with one or more orders. In some cases, interface module 505 may be configured to automatically generate an access code an associate the generated access code according to a configuration setting that stipulates automatic generation of the access code. In some cases, interface module 505 may be configured to generate a first access code for a first order and generate a second access code for a second order, where the second access code is different than the first access code. In some cases, interface module 505 may be configured to generate the same access code for both a first order and a second order.

In some embodiments, security module 510 may be configured to enable access to a premises via an access code generated for an order. In some embodiments, communication module 515 may be configured to send the generated access code to a second computing device or remote computing device associated with a delivery service assigned to deliver an item from the order. In some cases, the first computing device may include at least one of a computing device of the POS system, a mobile computing device of a purchaser associated with an order, a mobile computing device of an occupant of the premises where the item is to be delivered, a control panel of an automation system at the premises, or any combination thereof. In some cases, the second computing device may include at least one of a computing device of the delivery service, a mobile computing device of a delivery person, a computing device or mobile computing device of a delivery service dispatcher, or any combination thereof.

As one example, security module 510 may determine which delivery service is assigned to deliver an item and send the generated access code to a computing device associated with the determined delivery service. In some cases, communication module 515 may receive a tracking number from the POS system associated with the order and the security module 510 may determine the delivery service from the tracking number. In some cases, the POS system may send a message to communication module 515 that indicates the delivery service. In some cases, the message may indicate contact information for the designated delivery service. For example, the message may indicate at least one of a phone number, an email address, and social media contact information, or any combination thereof, for the designated delivery service. Accordingly, security module 510 may provide the generated access code based on the provided contact information.

In some embodiments, communication module 515 may be configured to receive a request from the second computing device associated with the delivery service. Accordingly, security module 510 may respond to the received message and indicate the generated access code in this response or a subsequent response. In some embodiments, security module 510 may be configured to verify the request before sending the generated access code to the second computing device.

In some embodiments, security module 510 may be configured to encrypt the generated access code. In some cases, security module 510 may be configured to store the access code or encrypted access code in a secure storage location. In one example, security module 510 may store the access code in an associated POS system. In some cases, security module 510 may store the access code in an offsite storage location such as in secure cloud storage. In some cases, security module 510 may store the access code in a control panel associated with the premises associated with an order.

In some embodiments, security module 510 may be configured to verify the access code provided by a delivery person before enabling access to the premises. For example, security module 510 may compare the provided access code with a stored access code to determine the provided access code is valid. In some cases, security module 510 may send a message to an occupant of the premises upon receiving the access code from the delivery person. In one example, security module 510 may enable access to the premises upon receiving a response from the occupant that access is permitted. As one example, the occupant may receive a real-time notification regarding the arrival of the delivery person to the premises. In some cases, the occupant may receive a live audio and/or image feed of the delivery in progress. In some cases, the occupant may be enabled to communicate with the delivery person in real-time (e.g., between the occupant's mobile computing device and an intercom at the premises over a data network). Accordingly, upon receiving both a valid access code and permission from the occupant, security module 510 may provide the delivery person access to the premises to enable the delivery person to delivery an item to a secure location of the premises instead of leaving the item outside such as outside on a porch of the premises.

In some embodiments, security module 510 may be configured to verify information associated with the delivery person before verifying the access code. In some cases, the delivery person may ring a doorbell and/or knock on the door of the premises and/or trigger a motion detector. Upon detecting the delivery person at the door, a camera may capture an image of delivery person. The security module 510 may compare the image to an image of the delivery person provided by the delivery company (e.g., a photo ID of the delivery person). In some cases, an automated system (e.g., a prerecorded message, a voice simulated message, etc.) may request that the delivery person stare into the camera in order to capture an image with a similar viewpoint as that of an image of the delivery person provided by the delivery company. For example, the secure delivery options may enable a user to specify delivery instructions. The delivery instructions may be delivered in text form via email, text messaging, social media messaging, etc. In some cases, communication module 515 may read the text from the provided delivery instructions and convert the text to speech and provide the text-to-speech delivery instructions via a speaker at the door of the premises. For example, upon receiving the access code from the delivery person the communication module 515 may provide the text-to-speech delivery instructions via the speaker.

In some cases, a delivery person may be instructed to place an identification card in relation to the camera. The identification card may include a photo ID of the delivery person, a delivery person name, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, the security module 510 may use any combination of the captured information (e.g., photo ID, name, barcode, RFID, etc.) to verify the identity of the delivery person. In some cases, such as when the delivery person arrives outside an expected period of time, additional verification may be requested.

In some embodiments, before granting the delivery person access to a secure delivery area, the security module 510 may request the delivery company verify the location of the delivery person. For example, secure delivery module 140-*a* may query the delivery company to determine the current location of the delivery vehicle associated with the expected delivery. In some embodiments, security module 510 may manage the secure delivery of the package once the arrival of an expected delivery is verified (e.g., verifying delivery information, identity of delivery person, etc.). In some cases, security module 510 may provide instructions to the delivery person regarding where to place the delivery at the premises.

In some cases, the instructions may be provided to the delivery person upon detecting the delivery person arriving at the premises. For example, the delivery person may knock on the door or ring the doorbell of the premises. Upon detecting the delivery person at the door, communication module 515 may provide instructions to the delivery person via a communication device (e.g., a speaker at the door that is part of an intercom system of the premises). The instructions may include pre-recorded messages, digital text-to-speech messages, and the like. For example, security module 510 play a recorded message from an intercom at the premises, the recorded message including instructions how and where to deliver the package (e.g., how to get a garage door to open, how to get a front door to unlock, where to place inside the garage of the premises, where to place inside the front door, etc.). In some embodiments, security module 510 may provide instructions to the delivery person via a data communication. For example, the delivery person may receive an email, a text message, a radio message (e.g., from a dispatch, etc.), and the like. In some cases, the delivery person may be notified that the process of placing the delivery at the designated delivery location will be recorded.

Figure 6:
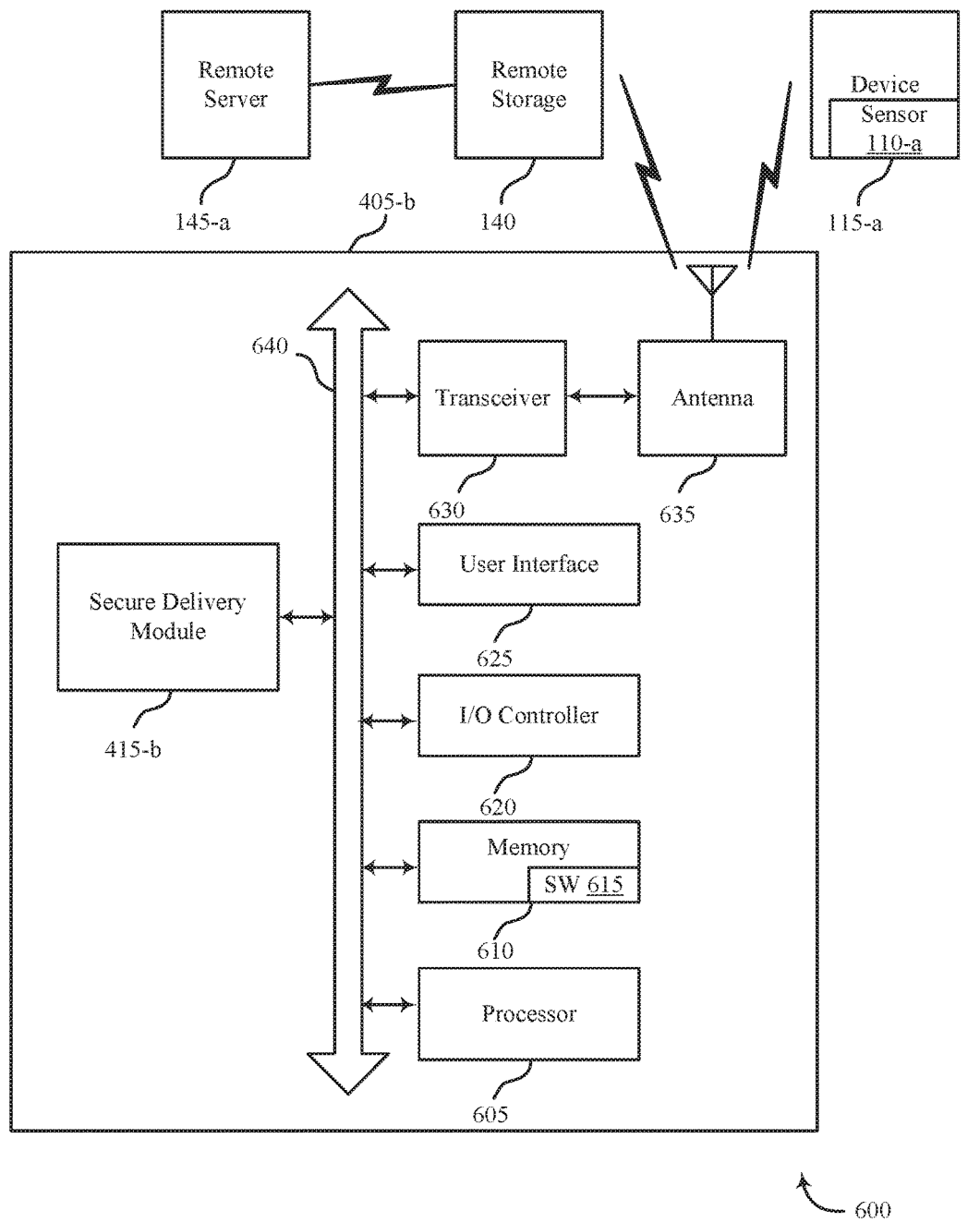
FIG. 6 shows a block diagram relating to a security and/or an automation system, in accordance with various aspects of this disclosure.

FIG. 6 shows a system 600 for use in automation systems, in accordance with various examples. System 600 may include an apparatus 405-*b*, which may be an example of the control panels 105 of FIG. 1. Apparatus 405-*b* may also be an example of one or more aspects of apparatus 405 and/or 405-*a* of FIGS. 2 and 3.

Apparatus 405-*b* may include components for bi-directional voice and data communications including components for transmitting communications and components for receiving communications. For example, apparatus 405-*b* may communicate bi-directionally with one or more of device 115-*a*, one or more sensors 110-*a*, remote storage 140, and/or remote server 145-*a*, which may be an example of the remote server of FIG. 1. This bi-directional communication may be direct (e.g., apparatus 405-*b* communicating directly with remote storage 140) and/or indirect (e.g., apparatus 405-*b* communicating indirectly with remote server 145-*a* through remote storage 140).

Apparatus 405-*b* may also include a processor module 605, and memory 610 (including software/firmware code (SW) 615), an input/output controller module 620, a user interface module 625, a transceiver module 630, and one or more antennas 635 each of which may communicate-directly or indirectly—with one another (e.g., via one or more buses 640). The transceiver module 630 may communicate bi-directionally-via the one or more antennas 635, wired links, and/or wireless links—with one or more networks or remote devices as described above. For example, the transceiver module 630 may communicate bi-directionally with one or more of device 115-*a*, remote storage 140, and/or remote server 145-*a*. The transceiver module 630 may include a modem to modulate the packets and provide the modulated packets to the one or more antennas 635 for transmission, and to demodulate packets received from the one 35, the control panel or the control device may also have multiple antennas 635 capable of concurrently transmitting or receiving multiple wired and/or wireless transmissions. In some embodiments, one element of apparatus 405-*b* (e.g., one or more antennas 635, transceiver module 630, etc.) may provide a direct connection to a remote server 145-*a* via a direct network link to the Internet via a POP (point of presence). In some embodiments, one element of apparatus 405-*b* (e.g., one or more antennas 635, transceiver module 630, etc.) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 635 and/or transceiver module 630 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 635 may receive signals or information specific and/or exclusive to itself. In other embodiments, each antenna 635 may receive signals or information not specific or exclusive to itself.

In some embodiments, one or more sensors 110-*a* (e.g., voice, button press, motion, proximity, smoke, light, glass break, door, audio, image, window, carbon monoxide, and/or another sensor) may connect to some element of system 600 via a network using one or more wired and/or wireless connections.

In some embodiments, the user interface module 625 may include an audio device, such as an external speaker system, an external display device such as a display screen, and/or an input device (e.g., remote control device interfaced with the user interface module 625 directly and/or through I/O controller module 620).

One or more buses 640 may allow data communication between one or more elements of apparatus 405-*b* (e.g., processor module 605, memory 610, I/O controller module 620, user interface module 625, etc.).

The memory 610 may include random access memory (RAM), read only memory (ROM), flash RAM, and/or other types. The memory 610 may store computer-readable, computer-executable software/firmware code 615 including instructions that, when executed, cause the processor module 605 to perform various functions described in this disclosure (e.g., generate an access code, associate the generated access code with an order of an item, and/or provide the generated access code to a delivery service assigned to deliver the item to a secure location of a premises, etc.). Alternatively, the software/firmware code 615 may not be directly executable by the processor module 605 but may cause a computer (e.g., when compiled and executed) to perform functions described herein. Alternatively, the computer-readable, computer-executable software/firmware code 615 may not be directly executable by the processor module 605 but may be configured to cause a computer (e.g., when compiled and executed) to perform functions described herein. The processor module 605 may include an intelligent hardware device, e.g., a central processing unit (CPU), a microcontroller, an application-specific integrated circuit (ASIC), etc.

In some embodiments, the memory 610 can contain, among other things, the Basic Input-Output system (BIOS) which may control basic hardware and/or software operation such as the interaction with peripheral components or devices. For example, the secure delivery module 415 to implement the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 630, one or more antennas 635, etc.).

Many other devices and/or subsystems may be connected to and/or included as one or more elements of system 600 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 6 need not be present to practice the present systems and methods. The devices and subsystems can be interconnected in different ways from that shown in FIG. 6. In some embodiments, an aspect of some operation of a system, such as that shown in FIG. 6, may be readily known in the art and are not discussed in detail in this application. Code to implement the present disclosure can be stored in a non-transitory computer-readable medium such as one or more of system memory 610 or other memory. The operating system provided on I/O controller module 620 may be iOS®, ANDROID®, MS-DOS®, MS-WINDOWS®, OS/2®, UNIX®, LINUX®, or another known operating system.

The transceiver module 630 may include a modem configured to modulate the packets and provide the modulated packets to the antennas 635 for transmission and/or to demodulate packets received from the antennas 635. While the control panel or control device (e.g., 405-*b*) may include a single antenna 635, the control panel or control device (e.g., 405-*b*) may have multiple antennas 635 capable of concurrently transmitting and/or receiving multiple wireless transmissions. The apparatus 405-*b* may include a secure delivery module 415-*b*, which may perform the functions described above for the secure delivery module 415 of apparatus 405 of FIGS. 4 and/or 5.

Figure 7:
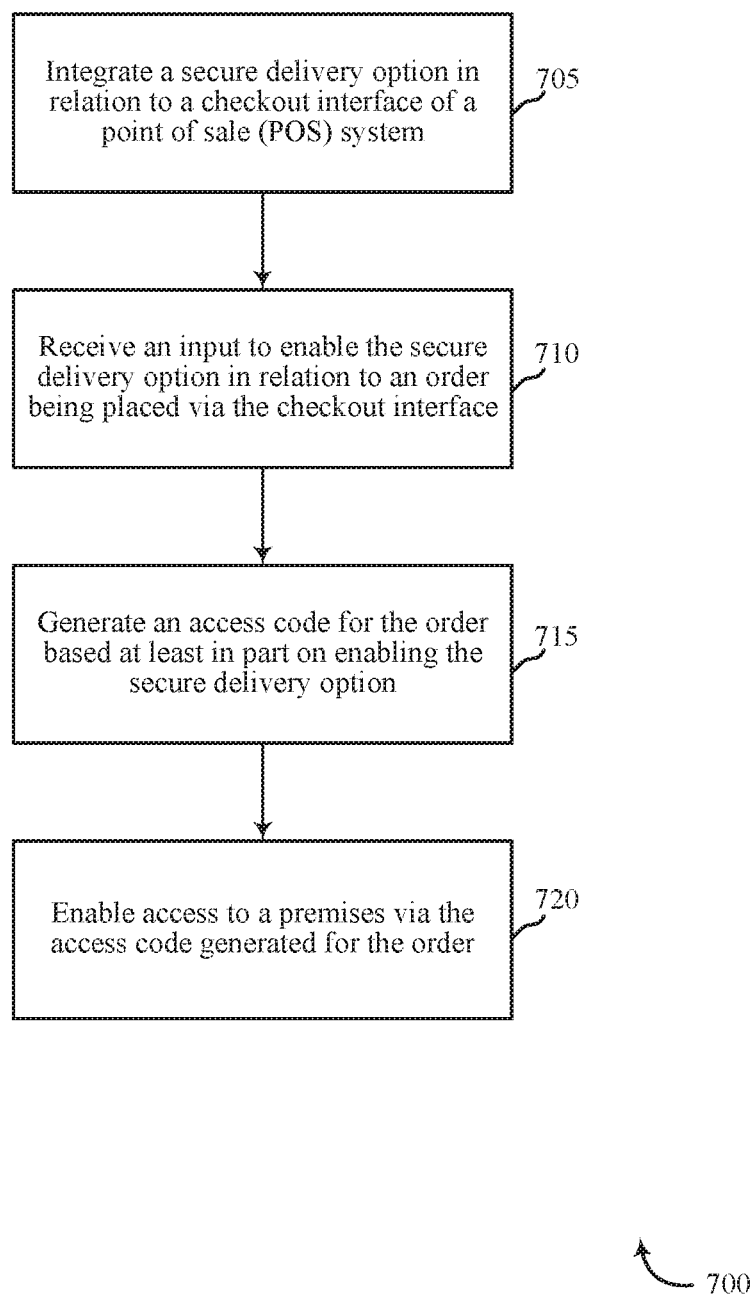
FIG. 7 is a flow chart illustrating an example of a method relating to a security and/or an automation system, in accordance with various aspects of this disclosure.

FIG. 7 is a flow chart illustrating an example of a method 700 for home automation, in accordance with various aspects of the present disclosure. For clarity, the method 700 is described below with reference to aspects of one or more of the sensor units 110 described with reference to FIGS. 1, and/or 6. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 705, method 700 may include integrating a secure delivery option in relation to a checkout interface of a point of sale (POS) system. At block 710, method 700 may include receiving an input to enable the secure delivery option in relation to an order being placed via the checkout interface. At block 715, method 700 may include generating an access code for the order based at least in part on enabling the secure delivery option. At block 720, method 700 may include enabling access to a premises via the access code generated for the order. The operation(s) at block 705-720 may be performed using the secure delivery module 415 described with reference to FIGS. 4-6 and/or another module.

Thus, the method 700 may provide for secure delivery of items relating to automation/security systems. It should be noted that the method 700 is just one implementation and that the operations of the method 700 may be rearranged, omitted, and/or otherwise modified such that other implementations are possible and contemplated.

Figure 8:
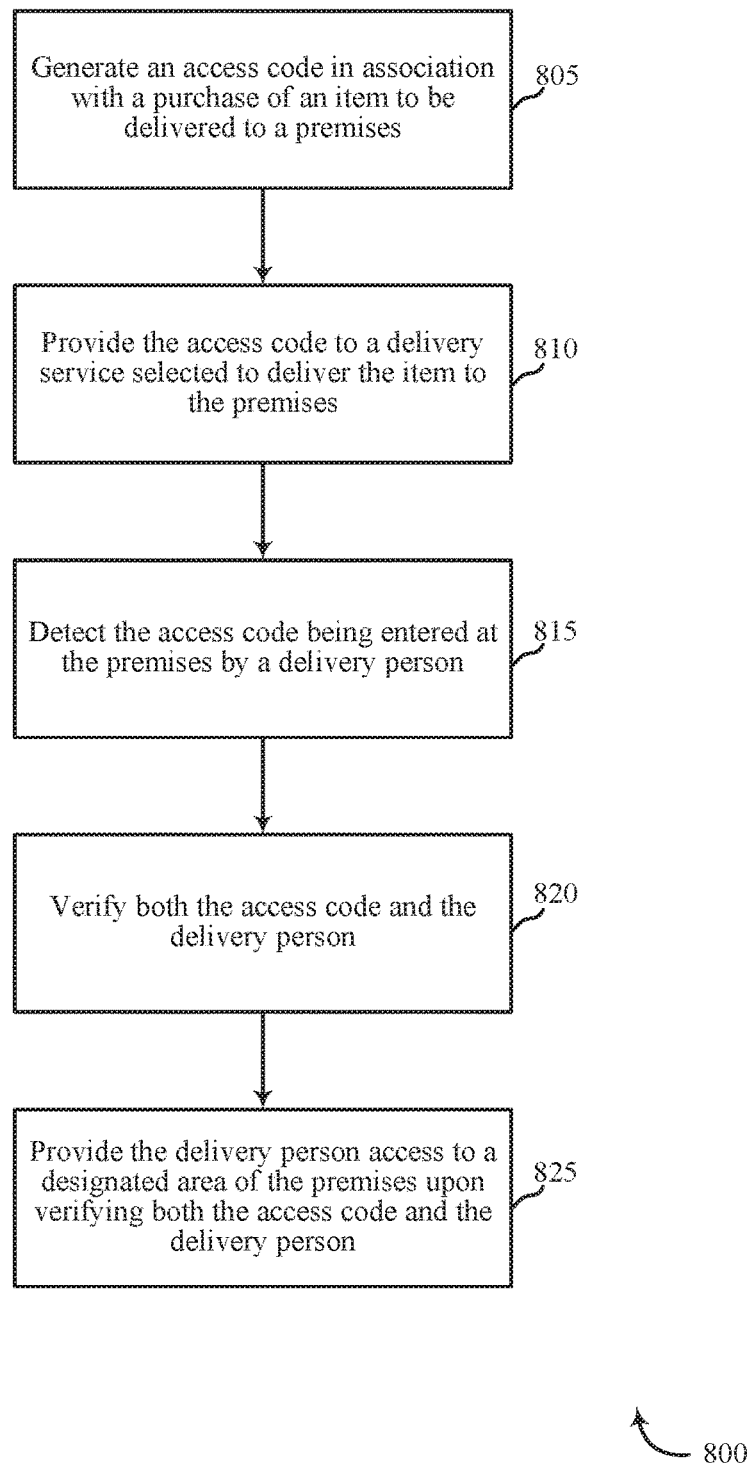
FIG. 8 is a flow chart illustrating an example of a method relating to a security and/or an automation system, in accordance with various aspects of this disclosure.

FIG. 8 is a flow chart illustrating an example of a method 800 for home automation, in accordance with various aspects of the present disclosure. For clarity, the method 800 is described below with reference to aspects of one or more of the sensor units 110 described with reference to FIGS. 1, and/or 6. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 805, method 800 may include generating an access code in association with a purchase of an item to be delivered to a premises. At block 810, method 800 may include providing the access code to a delivery service selected to deliver the item to the premises. At block 815, method 800 may include detecting the access code being entered at the premises by a delivery person. At block 820, method 800 may include verifying both the access code and the delivery person. At block 825, method 800 may include providing the delivery person access to a designated area of the premises upon verifying both the access code and the delivery person. The operations at blocks 805-825 may be performed using the secure delivery module 415 described with reference to FIGS. 4-6 and/or another module.

Thus, the method 800 may provide for secure delivery of an item by a delivery service and verification of the delivery service as relating to automation/security systems. It should be noted that the method 800 is just one implementation and that the operations of the method 800 may be rearranged, omitted, and/or otherwise modified such that other implementations are possible and contemplated.

In some examples, aspects from two or more of the methods 700 and 800 may be combined and/or separated. It should be noted that the methods 700 and 800 are just example implementations, and that the operations of the methods 700 and 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for secure delivery of parcels, comprising:
receiving, from a point of sale (POS) system via a control panel of an automation system at a premises, information regarding a secure delivery option for an order to be delivered to the premises wherein the order is placed via a checkout interface of the POS system;
generating, via the control panel of the automation system, an access code for the order based at least in part on receiving the information regarding the secure delivery option;
transmitting, via the control panel of the automation system, the access code to a delivery service associated with delivering the order based at least in part on generating the access code;
unlocking, via the control panel of the automation system, a first lock associated with a first area of the premises designated to receive the order in response to the access code generated for the order and transmitting the access code; and
verifying, via the control panel of the automation system, that a second lock associated with a second area of the premises is locked based at least in part on unlocking the first lock associated with the first area of the premises.

2. The method of claim 1, comprising:
sending the access code to a computing device associated with the delivery service assigned to deliver an item from the order, wherein enabling access to the first area is based at least in part on sending the access code to the computing device.

3. The method of claim 2, comprising:
receiving a request for the access code from the computing device associated with the delivery service; and
verifying the request before sending the access code to the computing device.

4. The method of claim 3, wherein the secure delivery option comprises at least one option to configure a custom access code in relation to placing the order via the checkout interface, to select a preconfigured access code that is preconfigured by the control panel of the automation system, to select a random access code randomly selected by the control panel of the automation system, to select a delayed access code that is generated upon receiving the request from the delivery service, to select a delivery time, to select the first area in relation to the premises, to select a location within the first area, to provide textual delivery instructions, to provide audible delivery instructions, or any combination thereof.

5. The method of claim 1, comprising:
encrypting the generated access code; and
storing the encrypted access code in a secure storage location.

6. The method of claim 1, comprising:
verifying the access code provided by a delivery person before enabling access to the first area.

7. The method of claim 6, comprising:
verifying information associated with the delivery person before verifying the access code.

8. The method of claim 1, wherein the POS system comprises at least one of a third-party POS system, an online POS system, a retail POS system at a physical location, or any combination thereof.

9. The method of claim 1, wherein the access code comprises a one-time access code.

10. The method of claim 1, further comprising:
restricting access to the second area of the premises different than the first area in response to the access code generated for the order.

11. The method of claim 1, further comprising:
receiving, by the control panel of the automation system, a scheduled delivery time, wherein the information comprises the scheduled delivery time; and
identifying a first time to generate the access code based at least in part on the scheduled delivery time, wherein generating the access code occurs at the first time.

12. The method of claim 11, wherein the access code comprises a delayed access code.

13. The method of claim 1, further comprising:
verifying, by the automation system, an identity of a delivery person, wherein enabling access to the first area is based at least in part on verifying the identity of the delivery person.

14. The method of claim 1, further comprising:
identifying that a delivery person remains in the first area longer than a time period; and
alerting an occupant of the premises based at least in part on identifying that the delivery person remains in the first area longer than the time period.

15. The method of claim 1, further comprising:
receiving at least one recorded instruction for the secure delivery of the order; and
outputting the at least one recorded instruction based at least in part on enabling access to the first area.

16. An apparatus for secure delivery of parcels, comprising:
a processor of a control panel of an automation system at a premises;
memory in electronic communication with the processor; and
instructions stored in the memory, the instructions being executable by the processor to:
receive, from a point of sale (POS) system via the control panel of the automation system, information regarding a secure delivery option for an order to be delivered to the premises, wherein the order is placed via a checkout interface of the POS system;
generate, via the control panel of the automation system, an access code for the order based at least in part on receiving the information regarding the secure delivery option;

transmit, via the control panel of the automation system, the access code to a delivery service associated with delivering the order based at least in part on generating the access code;

unlock, via the control panel of the automation system, a first lock associated with a first area of the premises designated to receive the order in response to the access code generated for the order and transmitting the access code; and verify, via the control panel of the automation system, that a second lock associated with a second area of the premises is locked based at least in part on unlocking the first lock associated with the first area of the premises.

17. The apparatus of claim 16, the instructions being executable by the processor to:

send the access code to a computing device associated with the delivery service assigned to deliver an item from the order, wherein enabling access to the first area is based at least in part on sending the access code to the computing device.

18. The apparatus of claim 17, the instructions being executable by the processor to:

receive a request for the access code from the computing device associated with the delivery service; and verify the request before sending the access code to the computing device.

19. A non-transitory computer-readable medium storing computer-executable code thereon for an automation system, the code executable by a processor of a control panel of the automation system at a premises to:

receive, from a point of sale (POS) system via the control panel of the automation system at the premises information regarding a secure delivery option for an order to be delivered to the premises wherein the order is placed via a checkout interface of the POS system;

generate, via the control panel of the automation system, an access code for the order based at least in part on receiving the information regarding the secure delivery option;

transmit, via the control panel of the automation system, the access code to a delivery service associated with delivering the order based at least in part on generating the access code;

unlock, via the control panel of the automation system, a first lock associated with a first area of the premises designated to receive the order in response to the access code generated for the order and transmitting the access code; and verify, via the control panel of the automation system, that a second lock associated with a second area of the premises is locked based at least in part on unlocking the first lock associated with the first area of the premises.

* * * * *